United States Patent
Nakajima

(10) Patent No.: US 9,707,639 B2
(45) Date of Patent: Jul. 18, 2017

(54) TIP DRESSER

(71) Applicant: KYOKUTOH CO., LTD., Aichi (JP)

(72) Inventor: Kotaro Nakajima, Aichi (JP)

(73) Assignee: Kyokutoh Co., Ltd., Nagoya (JP)

( * ) Notice: Subject to any disclaimer, the term of this patent is extended or adjusted under 35 U.S.C. 154(b) by 23 days.

(21) Appl. No.: 14/931,372

(22) Filed: Nov. 3, 2015

(65) Prior Publication Data

US 2016/0279733 A1   Sep. 29, 2016

Related U.S. Application Data

(63) Continuation of application No. PCT/JP2015/001644, filed on Mar. 23, 2015.

(51) Int. Cl.
| | | |
|---|---|---|
| *B23B 5/16* | (2006.01) | |
| *B23K 11/30* | (2006.01) | |
| *B23Q 11/00* | (2006.01) | |
| *B23C 3/12* | (2006.01) | |

(52) U.S. Cl.
CPC .......... *B23K 11/3063* (2013.01); *B23B 5/166* (2013.01); *B23Q 11/006* (2013.01); *B23C 3/12* (2013.01)

(58) Field of Classification Search
CPC  B23B 5/166; B23C 3/12; B23C 3/122; B23C 5/12; B23C 5/14; B23K 11/3063
See application file for complete search history.

(56) References Cited

U.S. PATENT DOCUMENTS

| | | | | |
|---|---|---|---|---|
| 6,106,203 | A | 8/2000 | Asmis et al. | |
| 6,666,631 | B2 * | 12/2003 | Yajima | B23K 11/3063 409/137 |
| 6,796,754 | B2 * | 9/2004 | Kobayashi | B23K 11/3063 409/137 |
| 6,863,597 | B2 * | 3/2005 | Sunaga | B23K 11/3063 219/119 |
| 2003/0013395 | A1 * | 1/2003 | Sakai | B23K 11/3063 451/453 |

(Continued)

FOREIGN PATENT DOCUMENTS

| | | | | |
|---|---|---|---|---|
| DE | EP 1797986 A1 * | 6/2007 | | B25B 5/166 |
| JP | 11179562 A | 7/1999 | | |

(Continued)

OTHER PUBLICATIONS

Extended European Search Report dated Apr. 25, 2016 for corresponding European Application No. 15784920.9.

(Continued)

*Primary Examiner* — Daniel Howell
(74) *Attorney, Agent, or Firm* — Renner, Otto, Boisselle & Sklar, LLP

(57) ABSTRACT

A rotary cutter includes a pair of recessed receivers which receive the respective tip ends of a pair of electrode tips, and a through portion which runs through in a rotation axis direction and provides an opening that communicates with each of the recessed receivers. A cover case covers the lower recessed receiver of the rotary cutter and has a notch which is associated with the lower recessed receiver. Over the upper recessed receiver of the rotary cutter, a cover plate is fixed to cover the upper recessed receiver. An electrode tip insertion hole is cut through a center portion of the cover plate.

5 Claims, 4 Drawing Sheets

(56) References Cited

U.S. PATENT DOCUMENTS

| | | | |
|---|---|---|---|
| 2010/0143061 A1 | | 6/2010 | Decker et al. |
| 2015/0059803 A1 | | 3/2015 | Fahnenstich |
| 2015/0360315 A1* | 12/2015 | Kusano ................. B08B 15/04 15/347 |

FOREIGN PATENT DOCUMENTS

| | | | |
|---|---|---|---|
| JP | 2002-361193 A | | 12/2002 |
| JP | 2003-80374 A | | 3/2003 |
| JP | 2004-202504 A | | 7/2004 |
| JP | 2010064090 A | * | 3/2010 |

OTHER PUBLICATIONS

International Search Report for corresponding International Application No. PCT/JP2015/001644 mailed Jun. 16, 2015.
Form PCT/ISA/237 for corresponding International Application No. PCT/JP2015/001644 dated Jun. 16, 2015.

* cited by examiner

TIP DRESSER

CROSS-REFERENCE TO RELATED APPLICATION

This is a continuation of International Application No. PCT/JP2015/001644 filed on Mar. 23, 2015. The entire disclosure of this application is hereby incorporated by reference.

BACKGROUND

The present disclosure relates to a tip dresser configured to cut the tip ends of spot-welding electrode tips.

In automobile production lines, a spot welding technique has often been used to assemble a car body. According to the spot welding technique, however, as the welding work is carried out over and over again, an increasingly thick oxide film is gradually deposited over the tip ends of the electrode tips. If the welding process were carried out with no redressing done on those thickened tips, then the quality of resultant welded portions would deteriorate. For that reason, such thickened tip ends of the electrode tips need to be regularly cut by a tip dresser to remove the oxide film.

Meanwhile, the chips to be shaved off while the electrode tips are being cut by the tip dresser may scatter and be deposited on a drive unit or any other part of another machine. In that case, the load on the drive unit increases, and in a worst-case scenario, increases so much as to cause a breakdown of the machine. Thus, to avoid such an unwanted situation, a portion of the tip dresser that performs the cutting work is enclosed in a cover case to prevent such chips from scattering to the environment.

For example, the tip dresser disclosed in Japanese Unexamined Patent Publication No. 2004-202504 includes a rotary cutter, of which the rotation axis extends vertically. The top and bottom surfaces of the rotary cutter are respectively provided with a pair of recessed receivers which receive the tip ends of electrode tips so that the center axis of the electrode tips agrees with the rotation axis of the rotary cutter. The tip dresser is configured to cut the respective tip ends of the electrode tips with a pair of cutting edges provided for the rotary cutter by rotating the rotary cutter with the tip ends of the pair of electrode tips, which are arranged to face each other on both sides of the rotary cutter in the rotation axis direction thereof, received in those recessed receivers. In addition, a pair of cover cases which respectively cover the top and bottom surfaces of the rotary cutter are respectively arranged over and under the rotary cutter so as to prevent chips to be shaved off through the cutting work with the rotary cutter from scattering.

SUMMARY

Indeed, arrangement of such cover cases over and under the rotary cutter as in Japanese Unexamined Patent Publication No. 2004-202504 does reliably prevent the chips shaved off through the cutting work on the electrode tips from scattering. In that case, however, the size of the tip dresser increases in the rotation axis direction.

In view of the foregoing background, it is therefore an object of the present disclosure to allow a tip dresser with the ability to simultaneously cut the respective tip ends of a pair of electrode tips that are arranged to face each other to have a compact structure that successfully prevents the chips shaved off through the cutting work from scattering.

To achieve this object, according to the present disclosure, the open end of one of two recessed receivers is covered with a cover case, and a cover plate is fixed to a rotary cutter so as to cover the open end of the other recessed receiver.

Specifically, a first aspect of the present disclosure is a tip dresser including: a rotary cutter configured to simultaneously cut respective tip ends of a pair of spot-welding electrode tips arranged to face each other on both sides in its rotation axis direction by rotating a pair of cutting edges which are provided for the respective tip ends; and a cover case configured to prevent chips shaved off by cutting work with the rotary cutter from scattering. The rotary cutter includes: a pair of recessed receivers arranged symmetrically in the rotation axis direction to receive the respective tip ends of the electrode tips so that the center axis of the electrode tips agrees with the rotation axis while the receivers are cutting the respective tip ends of the electrode tips; and a through portion running in the rotation axis direction to provide an opening that communicates with the respective recessed receivers. The cover case is provided to cover one side of the rotary cutter that has one of the pair of recessed receivers, and has an opening associated with the one recessed receiver. A cover plate having, at its center portion, an electrode tip insertion hole, of which the shape corresponds to the profile of the electrode tips, is fixed to the other side of the rotary cutter that has the other recessed receiver so as to cover the other recessed receiver.

A second aspect of the present disclosure is an embodiment of the first aspect of the present disclosure. In the second aspect, an air discharge means for discharging compressed air toward a surface of the cover plate is arranged close to the other side of the cover plate opposite from the rotary cutter, and a plurality of air inlet holes are cut side by side through the cover plate at such positions as to face the cutting edge in a direction in which the rotary cutter rotates.

A third aspect of the present disclosure is an embodiment of the second aspect of the present disclosure. In the third aspect, the air inlet holes form slits which extend radially from the rotation axis of the rotary cutter.

A fourth aspect of the present disclosure is an embodiment of any one of the first to third aspects of the present disclosure. In the fourth aspect, an air sucking means for sucking air from inside the cover case and a compressed air introducing means for introducing compressed air into the cover case are connected to the cover case. The compressed air introducing means and the air sucking means are spaced apart from each other so that the rotation axis of the rotary cutter is located between these two means.

According to the first aspect of the present disclosure, if the rotary cutter is rotated with one electrode tip inserted through an opening and received at one recessed receiver and with the other electrode tip inserted through the electrode tip insertion hole and received at the other recessed receiver, the tip ends of these electrode tips are cut by the respective cutting edges provided for the recessed receivers. Then, the chips shaved off by the one electrode tip will fly out through the open end of the one recessed receiver and go into the cover case, and therefore, are prevented from scattering. Meanwhile, the chips shaved off by the other electrode tip try to fly out through the open end of the other recessed receiver but actually collide against, and rebound from, the cover plate, and then go into the cover case by passing through the through portion. In this manner, all of those chips shaved off by cutting the electrode tips are allowed to go into the cover case, and are prevented reliably from scattering. In addition, unlike Japanese Unexamined Patent Publication No. 2004-202504, there is no need to provide cover cases on both sides of the rotary cutter in its rotation axis direction, which thus makes the tip dresser compact in its rotation axis direction.

According to the second aspect of the present disclosure, the compressed air discharged by the air discharge means is blown against the cutting edges through the air inlet holes of the cover plate, thus shaking the chips off the cutting edges and preventing the chips from disturbing the work of cutting the tip ends of the electrode tips.

According to the third aspect of the present disclosure, the air inlet holes have an elongate shape, which thus allows for preventing the chips shaved off while cutting the electrode tips from abruptly passing through the air inlet holes and scattering around the tip dresser.

According to the fourth aspect of the present disclosure, the chips accumulated in the vicinity of the air sucking means inside the cover case are evacuated from the cover case by having the air sucking means suck air from inside the cover case. Meanwhile, the chips accumulated in the vicinity of the compressed air introducing means inside the cover case are caused by a turbulent airflow, produced by the compressed air introduced by the compressed air introducing means, to float and travel toward the air sucking means. Thereafter, the chips are evacuated by the air sucking means from the cover case. In this manner, all of the chips shaved off inside the cover case are evacuated from the cover case with reliability.

DETAILED DESCRIPTION

Embodiments of the present disclosure will now be described with reference to the accompanying drawings. Note that the following description of preferred embodiments is merely an example in nature.

Figure 1:
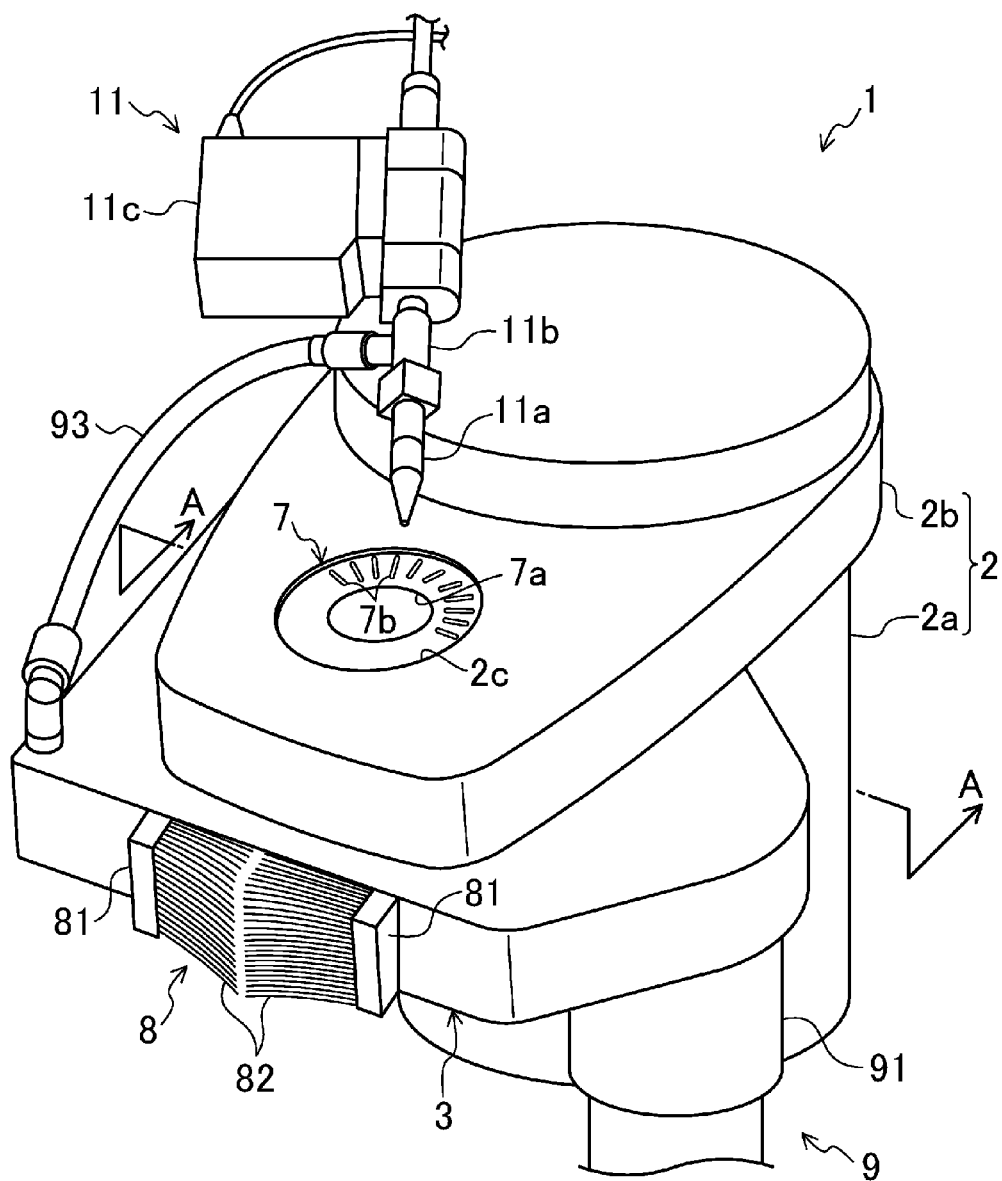
FIG. 1 is a perspective view of a tip dresser according to an embodiment of the present disclosure.

FIG. 1 illustrates a tip dresser 1 according to an embodiment of the present disclosure. This tip dresser 1 is configured to simultaneously cut the tip ends 10a of a pair of spot-welding electrode tips 10 (see FIG. 4) which are fitted into the ends of a shank G1 of a welding gun (not shown) so as to face each other. This tip dresser 1 includes a body case 2 surrounding the primary parts of the tip dresser 1, and a cover case 3 configured to prevent chips shaved off during the cutting process from scattering.

The body case 2 includes a motor housing portion 2a which has a generally circular cylindrical shape extending vertically and which houses a drive motor (not shown) inside and a generally rectangular plate-like protruding portion 2b which protrudes horizontally from a region of the motor housing portion 2a close to the top thereof.

Figure 2:
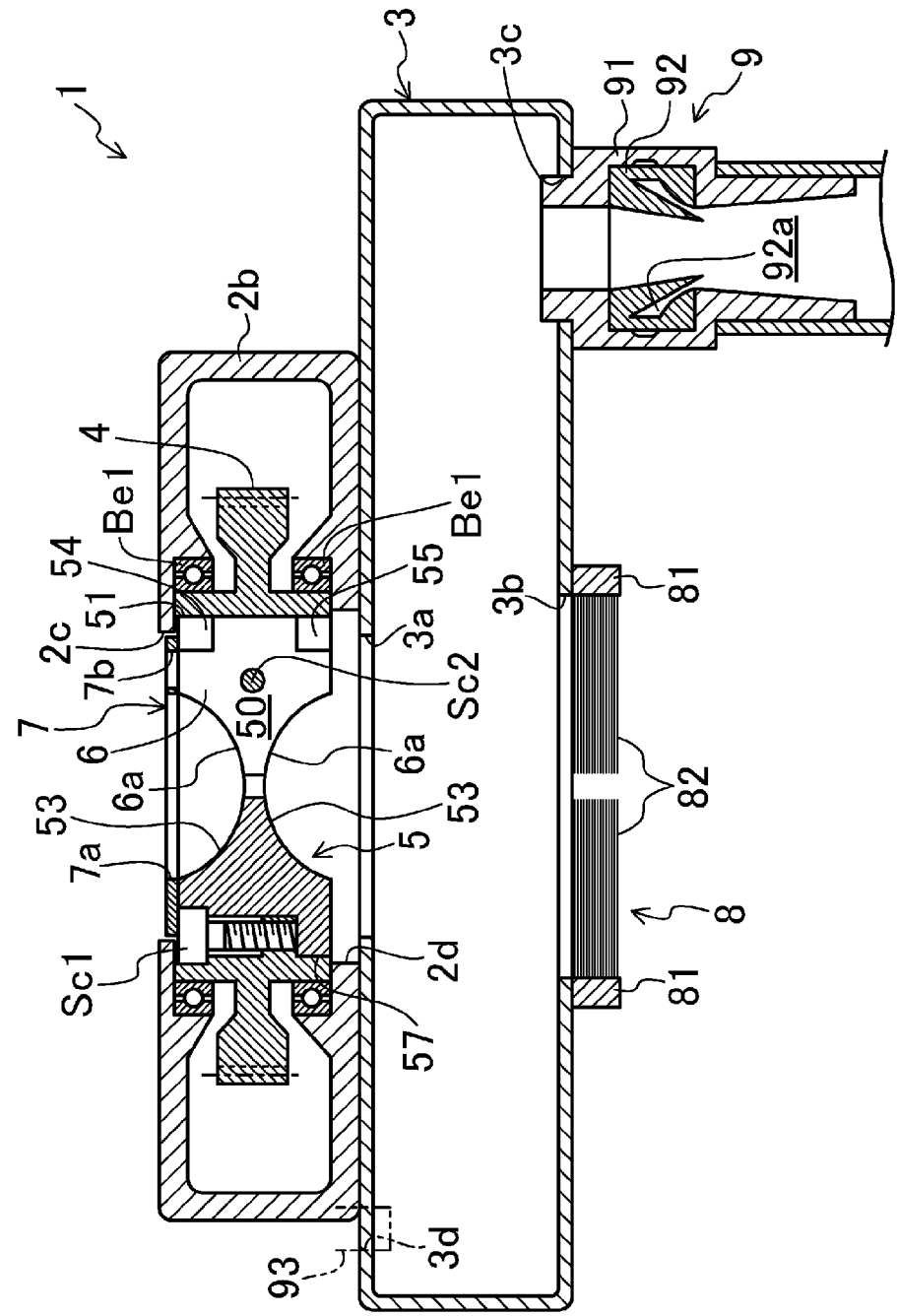
FIG. 2 is a cross-sectional view taken along the plane A-A shown in FIG. 1.

As shown in FIG. 2, an upper through hole 2c and a lower through hole 2d are respectively cut through the upper and lower surfaces of a generally center region of the plate-like protruding portion 2b.

Inside the plate-like protruding portion 2b and between the upper and lower through holes 2c and 2d, a ringlike output gear 4 is attached rotatably on a vertically extending rotation axis C1 via a pair of (i.e., upper and lower) bearings Be2. The output gear 4 is configured to be rotated on the rotation axis C1 by a drive motor and a gear engaging mechanism (neither is shown).

Inside the output gear 4, a rotary cutter 5 is attached removably with a screw Sc1.

Figure 3:
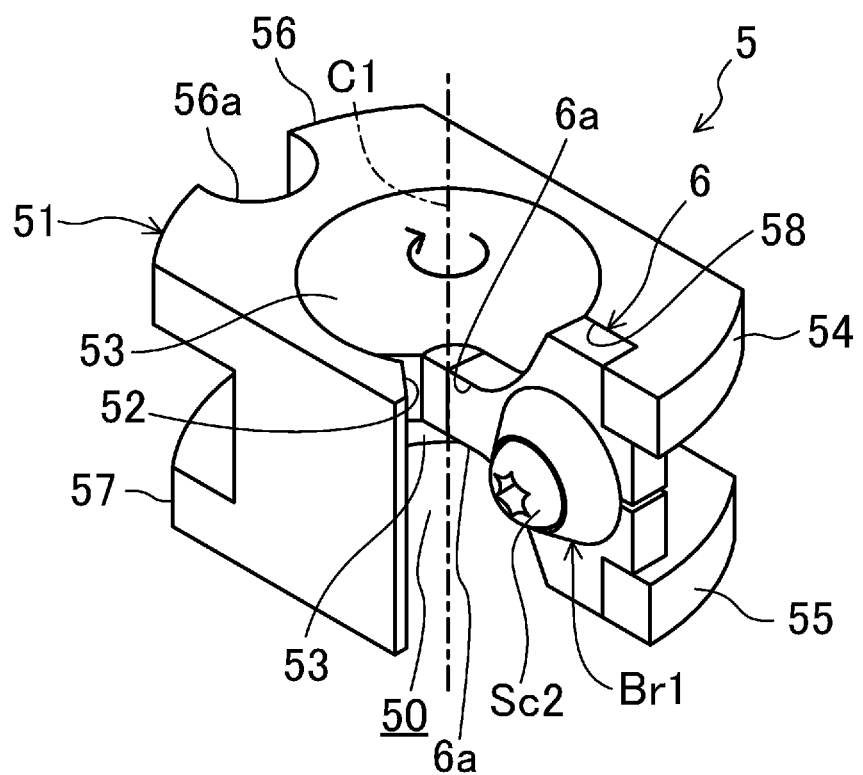
FIG. 3 is a perspective view of a rotary cutter attached to a tip dresser according to an embodiment of the present disclosure.

As shown in FIG. 3, the rotary cutter 5 includes a metallic holder 51 which forms a generally C shape with a broad width on a plan view and which also defines a vertically short columnar shape.

The holder 51 has, on one end in the longitudinal direction, a notched recess 52 which is not only open sideward and outward but also extends vertically to be open both upward and downward. The notched recess 52 has a generally notched fan shape on a plan view.

Furthermore, the upper and lower surfaces of the holder 51 respectively have a pair of recessed receivers 53, of which the diameter gradually decreases toward the middle portion of the holder 51. These recessed receivers 53 are symmetrical to each other in the rotation axis direction.

Each of the recessed receivers 53 has a shape corresponding to the curved shape of the tip ends 10a of the electrode tips 10, and is configured to receive the tip end 10a of an associated one of the electrode tips 10 in a state where the center axis of the electrode tip 10 agrees with the rotation axis C1.

At the upper and lower edges of the holder 51 on one side in the longitudinal direction thereof, defined respectively are upper and lower overhanging portions 54 and 55 which overhang outward and sideward.

On the other hand, at the upper and lower edges of the holder 51 on the other side in the longitudinal direction thereof, defined respectively are upper and lower protrusions 56 and 57 which not only protrude outward and sideward but also extend horizontally (i.e., in a direction which intersects with the longitudinal direction of the holder 51). A semicircular recess 56a which is open outward and sideward has been cut through a middle of the upper protrusion 56.

A portion to be surrounded with the inner peripheral surface of the output gear 4 and the notched recess 52 when the rotary cutter 5 is fitted into the output gear 4 constitutes a through portion 50 according to the present disclosure. The through portion 50 runs through in the rotation axis direction and provides an opening that communicates with the respective recessed receivers 53.

An inner side surface of the notched recess 52 is provided with a mounting surface 58 which runs in the longitudinal direction of the holder 51. The mounting surface 58 has a generally triangular shape on a side view.

To the mounting surface 58, a generally triangular metallic cutting plate 6, which is used to cut the tip ends 10a of the electrode tips 10, and a ringlike metallic breaker Br1 with a tapered outer peripheral surface are fastened with a screw Sc2.

The upper and lower edges of the cutting plate 6 define a pair of cutting edges 6a. When the cutting plate 6 is mounted to the mounting surface 58, the respective cutting edges 6a have a curved shape corresponding to that of the respective recessed receivers 53.

Over the upper recessed receiver 53 of the rotary cutter 5, a disklike cover plate 7 is fixed so as to cover the open end of the upper recessed receiver 53.

An electrode tip insertion hole 7a, of which the shape corresponds to the profile of the electrode tips 10, is cut through a middle portion of the cover plate 7.

Also, a plurality of air inlet holes 7b are cut side by side through the cover plate 7 at such positions as to face the cutting edge 6a in the rotating direction of the rotary cutter 5. The respective air inlet holes 7b form slits that extend radially from the rotation axis C1 of the rotary cutter 5.

Over the cover plate 7 (i.e., over the surface of the cover plate 7 opposite from the rotary cutter 5), arranged closely is an air discharge unit 11 (which is an implementation of the air discharge means) which discharges compressed air toward the surface of the cover plate 7.

The air discharge unit 11 includes a generally stylus-shaped discharge nozzle 11a which discharges compressed air, a first air tube 11b which guides the compressed air to the discharge nozzle 11a, and a box-shaped solenoid valve 11c which is connected to a halfway point on the first air tube 11b to control the discharge of the compressed air through the discharge nozzle 11a. The tip end of the discharge nozzle 11a is arranged at such a position as to face an outer peripheral portion of the surface of the cover plate 7.

The cover case 3 has a plate shape which extends horizontally so as to intersect with the direction in which the plate-like protruding portion 2b protrudes. One longitudinal end of the cover case 3 forms an inverted V shape on a plan view.

A communicating hole 3a which communicates with the inner space of the cover case 3 is cut through the upper surface of the cover case 3. The cover case 3 is fixed to the lower surface of the plate-like protruding portion 2b so that the communicating hole 3a faces the lower recessed receiver 53. That is to say, the cover case 3 is provided to cover the lower recessed receiver 53 of the rotary cutter 5. As can be seen, the tip dresser 1 according to this embodiment of the present disclosure has its size reduced in its rotation axis direction, because unlike Japanese Unexamined Patent Publication No. 2004-202504, there is no need to provide cover cases 3 on both sides of the rotary cutter 5 in its rotation axis direction.

The lower surface of the cover case 3 and a side surface thereof distant from the motor housing portion 2a are provided with a broad continuously notch 3b (opening) which extends horizontally so as to intersect with the longitudinal direction of the cover case 3. The notch 3b is associated with the lower recessed receiver 53.

The notch 3b is covered with a pair of cover brushes 8 which are arranged side by side in the longitudinal direction of the cover case 3.

Each of the cover brushes 8 includes a base member 81 which runs along a side edge portion of the notch 3b and a bundle of resin bristles 82 which are transplanted onto the base member 81. The two bundles of bristles 82 of the respective base members 81 extend in the longitudinal direction of the cover case 3 to reach an approximately center portion of the notch 3b and eventually cover the notch 3b.

Figure 4:
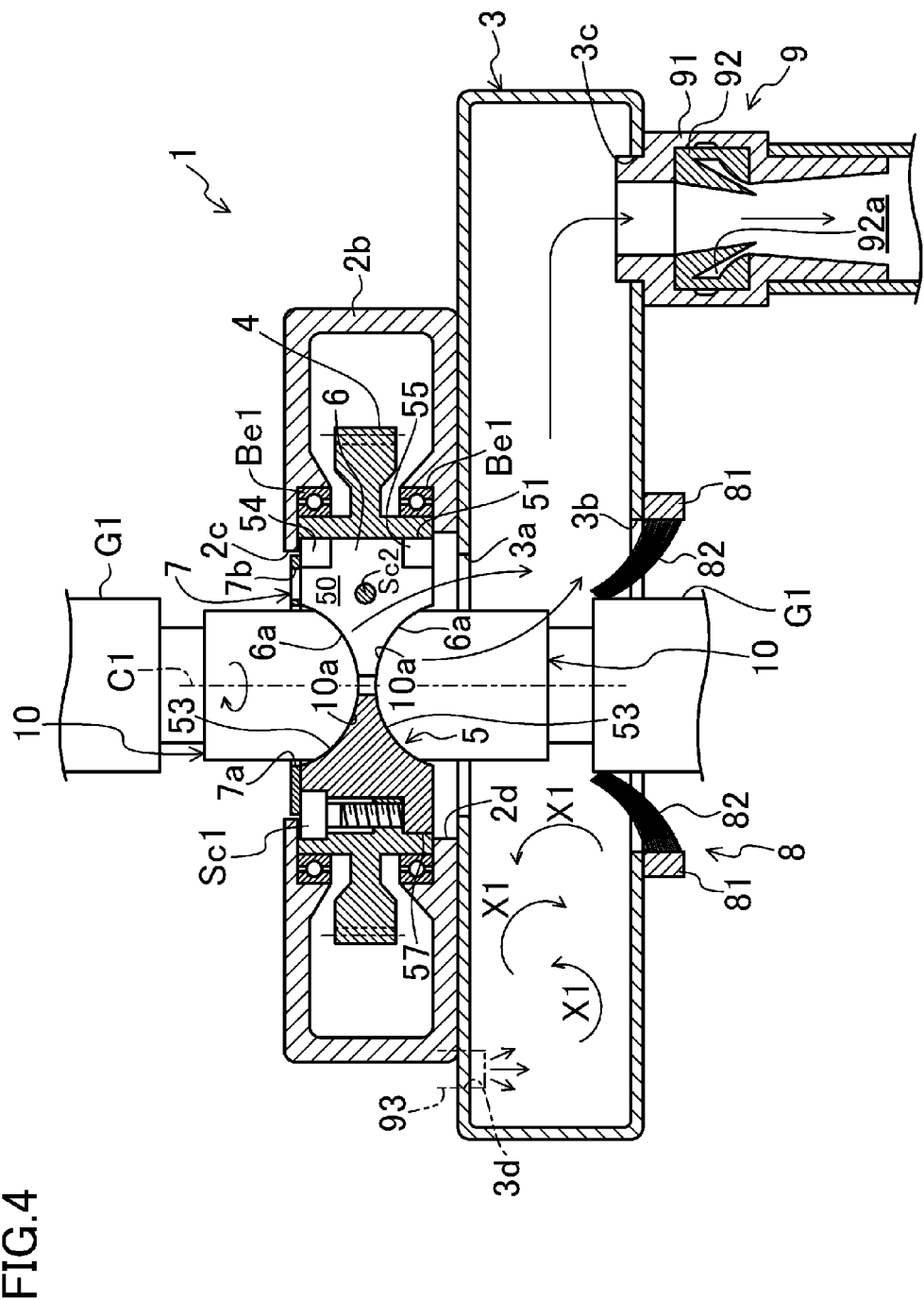
FIG. 4 is a view corresponding to FIG. 2 and illustrating a state where the respective tip ends of a pair of electrode tips are being cut simultaneously with a tip dresser according to an embodiment of the present disclosure.

The respective bundles of bristles 82 are configured to bend upward and close the gap between the side edges of the notch 3b and the outer periphery of the electrode tip 10 as shown in FIG. 4 when the electrode tip 10 is inserted from under, and passed through, the notch 3b.

A first mounting hole 3c which communicates with the inner space is cut through the lower surface of the cover case 3 on one end of the longitudinal direction thereof. An air sucking tool 9 (air sucking means) for sucking air from inside the cover case 3 is connected to the first mounting hole 3c.

The air sucking tool 9 includes a generally cylindrical tool body 91 which extends vertically. The outer peripheral surface of an upper half of the tool body 91 protrudes outward with respect to the outer peripheral surface of a lower half thereof.

A ringlike recessed groove which runs around the center axis of the cylinder is provided halfway on the inner peripheral surface of the tool body 91. The rest of the inner peripheral surface of the tool body 91 under the ringlike recessed groove has an inverted tapered shape, of which the diameter gradually increases downward.

A generally ringlike sucking unit 92 is fitted into the ringlike recessed groove. Inside the sucking unit 92, defined is a ringlike air passage 92a, of which the width gradually decreases downward.

When compressed air is introduced into an upper portion of the air passage 92a using an air compressor (not shown), the compressed air is discharged through the air passage 92a into a lower portion of the space inside the tool body 91. As a result, the upper portion of the space inside the tool body 91 comes to have a negative pressure. Consequently, the air is sucked from inside the cover case 3 through the upper portion of the tool body 91 and then evacuated through the lower portion of the tool body 91.

The upper surface of the cover case 3 at the other end in the longitudinal direction thereof is provided with a second mounting hole 3d which communicates with the inner space.

One end of a second air tube 93 to introduce compressed air into the space inside the cover case 3 (i.e., compressed air introducing means) is connected to the second mounting hole 3d. That end of the second air tube 93 and the air sucking tool 9 are spaced apart from each other such that the rotation axis C1 of the rotary cutter 5 is located between them.

Meanwhile, the other end of the second air tube 93 is connected to a halfway point on the first air tube 11b so that part of the compressed air discharged out of the air discharge unit 11 is introduced into the space inside the cover case 3.

Subsequently, with the rotary cutter 5 rotated around the rotation axis C1, a pair of electrode tips 10 are arranged to face each other so as to vertically interpose the plate-like protruding portion 2b and the cover case 3 between them (i.e., on both sides in the rotation axis direction), and are brought close to each other. Then, as shown in FIG. 4, the tip end 10a of the upper electrode tip 10 passes through the electrode tip insertion hole 7a and is received by the upper recessed receiver 53 and cut by the upper cutting edge 6a. On the other hand, the tip end 10a of the lower electrode tip 10 goes through the respective bundles of bristles 82 of the cover brushes 8, passes through the notch 3b and the communicating hole 3a, and is received by the lower recessed receiver 53 and cut by the lower cutting edge 6a.

Next, it will be described how to perform the work of cutting the tip ends 10a of the electrode tips 10 with the tip dresser 1.

First of all, by driving a drive motor (not shown) of the tip dresser 1 in rotation, the output gear 4 is turned, thereby rotating the rotary cutter 5 on the rotation axis C1.

Also, compressed air is supplied to the air sucking tool 9 and air discharge unit 11 using an air compressor (not shown). In this manner, the air inside the cover case 3 is sucked by the air sucking tool 9 and evacuated from the cover case 3. In the meantime, the compressed air is also discharged through the discharge nozzle 11a onto the surface of the cover plate 7, and is introduced into the space inside the cover case 3 through the second air tube 93.

Next, the two electrode tips 10 vertically facing each other are moved to over the plate-like protruding portion 2b and to under the cover case 3, respectively, and the center axis of the respective electrode tips 10 is aligned with the rotation axis C1 of the rotary cutter 5.

Thereafter, the two electrode tips 10 are brought close to each other. Then, as shown in FIG. 4, the upper electrode tip 10 passes through the electrode tip insertion hole 7a of the cover plate 7 and is received by the upper recessed receiver 53, and has its tip end 10a cut by the upper cutting edge 6a of the rotary cutter 5 that is rotating.

On the other hand, the lower electrode tip 10 goes through the respective bundles of bristles 82 of the cover brushes 8, passes through the notch 3b and the communicating hole 3a in this order, and is received by the lower recessed receiver 53 and has its tip end 10a cut by the lower cutting edge 6a of the rotary cutter 5 that is rotating.

In this case, the compressed air discharged through the discharge nozzle 11a is blown against the cutting edges 6a of the cutting plate 6 through the air inlet holes 7b of the cover plate 7 that rotates along with the rotary cutter 5, thus shaking the chips off the cutting edges 6a and preventing the chips from disturbing the work of cutting the tip ends 10a of the electrode tips 10.

The chips shaved off by the lower electrode tip 10 will fly out through the open end of the lower recessed receiver 53 and go into the cover case 3, and therefore, are prevented from scattering. Meanwhile, the chips shaved off by the upper electrode tip 10 try to fly out through the open end of the upper recessed receiver 53 but actually collide against, and rebound from, the cover plate 7, and then go into the cover case 3 by passing through the through portion 50 and the communicating hole 3a. In this manner, all of those chips shaved off by cutting the electrode tips 10 are allowed to go into the same cover case 3, and are prevented reliably from scattering.

Furthermore, the air inlet holes 7b have an elongate shape, which thus allows for preventing the chips shaved off while cutting the electrode tips 10 from abruptly passing through the air inlet holes 7b and scattering around the tip dresser 1.

The chips moved into the cover case 3 which are accumulated in the vicinity of the air sucking tool 9 are evacuated from the cover case 3 by having the air sucking tool 9 suck air from inside the cover case 3. Meanwhile, the chips accumulated in the vicinity of the second air tube 93 inside the cover case 3 are caused by a turbulent airflow (indicated by X1 in FIG. 4), produced by the compressed air introduced by the second air tube 93, to float and travel toward the air sucking tool 9. Thereafter, the chips are evacuated by the air sucking tool 9 from the cover case 3. In this manner, all of the chips accumulated inside the cover case 3 are evacuated from the cover case 3 with reliability.

In the embodiment of the present disclosure described above, the tip dresser is configured such that the rotation axis C1 of the rotary cutter 5 extends vertically. However, this is only a non-limiting example. Alternatively, the tip dresser may also be configured such that the rotation axis C1 tilts obliquely.

Also, in the embodiment of the present disclosure described above, the air inlet holes 7b have a slit shape. However, the air inlet holes 7b may also have a circular shape or a triangular shape, for example.

Furthermore, in the embodiment of the present disclosure described above, the bristles 82 are made of resin. However, this is only a non-limiting example. Alternatively, the bristles 82 may also be made of a metallic material.

The present disclosure is useful as a tip dresser configured to cut the tip ends of spot-welding electrode tips.

What is claimed is:

1. A tip dresser comprising:
a rotary cutter configured to simultaneously cut respective tip ends of a pair of spot-welding electrode tips, arranged to face each other on both sides in its rotation axis direction, by rotating a pair of cutting edges which are provided for the respective tip ends; and
a cover case configured to prevent chips shaved off by cutting work with the rotary cutter from scattering, wherein
the rotary cutter includes:
a pair of recessed receivers arranged symmetrically in the rotation axis direction to receive the respective tip ends of the electrode tips so that the center axis of the electrode tips agrees with the rotation axis while the receivers are cutting the respective tip ends of the electrode tips; and
a through portion running in the rotation axis direction to provide an opening that communicates with the respective recessed receivers,
the cover case is provided to cover one side of the rotary cutter that has one of the pair of recessed receivers, and has an opening associated with the one recessed receiver,
a cover plate having, at its center portion, an electrode tip insertion hole, of which the shape corresponds to the profile of the electrode tips, is fixed to the other side of the rotary cutter that has the other recessed receiver so as to cover the other recessed receiver,
an air discharge means for discharging compressed air toward a surface of the cover plate is arranged close to the other side of the cover plate opposite from the rotary cutter, and
a plurality of air inlet holes are cut side by side through the cover plate at such positions as to face the cutting edge in a direction in which the rotary cutter rotates.

2. The tip dresser of claim 1, wherein
the air inlet holes form slits which extend radially from the rotation axis of the rotary cutter.

3. The tip dresser of claim 1, wherein
an air sucking means for sucking air from inside the cover case and a compressed air introducing means for introducing compressed air into the cover case are connected to the cover case, the compressed air introducing means and the air sucking means being spaced apart from each other so that the rotation axis of the rotary cutter is located between these two means.

4. The tip dresser of claim 1, wherein
an air sucking means for sucking air from inside the cover case and a compressed air introducing means for introducing compressed air into the cover case are connected to the cover case, the compressed air introducing means and the air sucking means being spaced apart from each other so that the rotation axis of the rotary cutter is located between these two means.

5. The tip dresser of claim 2, wherein
an air sucking means for sucking air from inside the cover case and a compressed air introducing means for introducing compressed air into the cover case are connected to the cover case, the compressed air introducing means and the air sucking means being spaced apart from each other so that the rotation axis of the rotary cutter is located between these two means.

* * * * *